Sept. 6, 1966    G. H. STRAM    3,270,417
FLUID OPERATED DENTAL HANDPIECE
Filed July 5, 1963
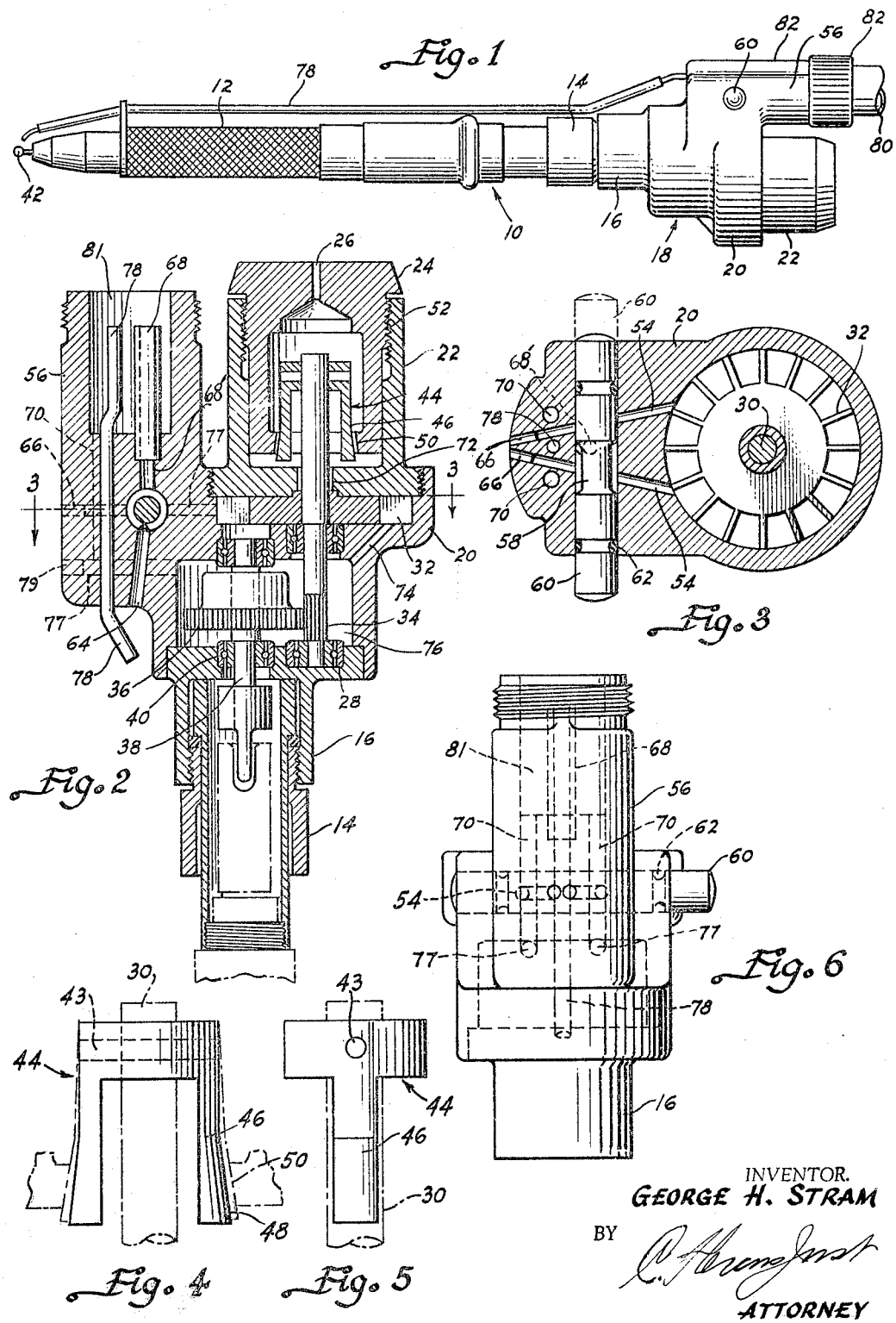
INVENTOR.
GEORGE H. STRAM
BY
ATTORNEY

United States Patent Office 3,270,417
Patented Sept. 6, 1966

3,270,417
FLUID OPERATED DENTAL HANDPIECE
George H. Stram, Hellam, Pa., assignor to The Dentists' Supply Company of New York, York, Pa., a corporation of New York
Filed July 5, 1963, Ser. No. 292,873
19 Claims. (Cl. 32—26)

This invention relates to a dental handpiece or similar industrial grinder in which the bur or other cutting tool is rotated by an air-driven dental turbine at relatively low speed, in comparison with contemporary air-driven dental handpieces, for example, but having substantially higher torque than such contemporary handpieces and hand grinders or the like.

One of the primary objects of the invention resides in providing such a dental handpiece or small hand grinder or similar tool with an adjustable, but automatically operated braking device, which will function to variously limit the upper speed of the driving member and cutting tool but which will be automatically released so as to minimize or eliminate the braking action and thereby permit the entire power produced by the driving member to be used beneficially by the grinding or cutting tool, when the tool meets the resistance of the object being worked on.

Another object of the invention consists in providing such a handpiece or tool with a braking mechanism in which the exhaust air from the turbine may be employed in cooling the braking member and thereby extend its life.

A further object of the invention resides in providing means for cooling the bearings of the turbine rotor and drive shafts by the exhaust fluid from the turbine.

A still further object of the invention consists in the provision of a simple and rather inexpensive flexible brake member which may be formed of a suitable synthetic resin, such as Teflon, or metal or the like, which may be readily replaced when worn.

Another object of the invention consists in providing an adjustable braking mechanism including an adjustable thimble which may be readily removed to permit access to the brake for removal and substitution when the brake becomes worn, or is otherwise rendered ineffective.

Other objects and advantages of the invention will be, in part, apparent and in part pointed out in the following specification and the accompanying drawing forming a part thereof.

In the drawing:

FIG. 1 is a side elevation of an exemplary handpiece embodying the principles of the present invention.

FIG. 2 is an enlarged central longitudinal section of the base portion of the housing, including the air turbine, brake mechanism and related parts.

FIG. 3 is a transverse sectional view taken on line 3—3 of FIG. 2.

FIGS. 4 and 5 are different elevational views of details of the rotatable element of the braking mechanism, and FIG. 6 is a side elevational view of the casing looking from the left of FIG. 2.

Referring to the drawings in greater detail and by reference numerals, an exemplary dental handpiece is shown having a casing 10 which includes a cylindrical handle portion 12, a ferrule 14 for connecting the inner end of the handle portion to the neck 16 of a housing 18, which latter includes a base portion 20, and a sleeve 22 threadably connected to the base portion to complete the lower portion of the housing for the rotor of the turbine to be later described. The upper portion of the housing is closed by a thimble 24 threaded to the sleeve 22 and provided with an exhaust port or vent 26 for the fluid-operated turbine. While especially suitable to drive a dental bur, it is obvious from the illustrations in the drawing that a device of this type readily is suitable for use as a small hand grinder of an industrial nature, or otherwise.

Mounted within the housing just described, in anti-friction bearings 28, is a shaft 30 for a turbine rotor 32 of the outboard type relative to bearings 28. This shaft is provided with a relatively small pinion gear 34 which intermeshes with a gear wheel 36 fixed to a drive shaft 38 mounted in anti-friction bearings 40. At the outer end of the handle 12 is a bur or other cutting tool 42 which is secured detachably to the outer end of the drive shaft 38 extended, by a suitable chuck, not shown. This reduction gearing 34–36 of substantial difference in diameters serves to provide a relatively low speed, high torque operation of the tool.

Fixed to an extension of the turbine shaft 30 by any suitable means such as pin 43 is the braking member 44. This member is illustrated in the present disclosure as being of inverted U-shape, and the legs 46 are so constructed as to be fairly flexible so as to be deflected outwardly to varying degrees by centrifugal force as the turbine shaft 30 is rotated by the rotor 32. This braking member preferably is formed from resilient metal so as to have such suitable flexibility, for purposes to be described.

The outer surfaces 48 of the lower ends of the legs 46 are beveled outwardly and downwardly slightly, as best shown in FIG. 4, to form inclined faces for cooperation with the conical inner face 50 formed on the lower edge of the thimble 24 heretofore referred to. This thimble 24 preferably is formed from suitable synthetic resin, capable of being molded inexpensively from such commercially available resins as nylon, Teflon, and the like. Said thimble is connected by threads 52 to the upper internally threaded end of sleeve 22 and it will be apparent that by rotating the thimble 24 the normal spacing of the faces 48 and 50 may be varied longitudinally, as desired, to effect proper spacing. Consequently, the braking action of these elements may be varied to suit varying working conditions, as will be described hereinafter.

Motive power is supplied to the rotor 32 through either of two tangential passageways 54 (FIG. 3) bored through a lateral extension 56 of the base 20 of the housing. These passageways communicate with a reduced portion 58 of a reciprocable valve 60 slidably mounted in the base 20. O-rings 62 mounted adjacent opposite ends of valve member 60 prevent the escape of pressure fluid and a pin 64 projecting into the portion 58 of the valve member limits the valve movement to an extent adequate to the proper positioning of the reduced portion 58 to communicate with the selected passageway of the several passageways 54 to thereby control the direction of rotation of the turbine. The outer ends of these passageways which are necessary to form the inner ends thereof by drilling, perform no useful function in the operation of the device and therefore are closed by driving metal plugs 66 or the like therein.

Pressure fluid to operate the turbine may be conveyed to the valve 58–60 by means of a vertical tubular conduit 68 which connects with passageway 68' in bored extension 56 on base 20 and thence to the valve 58–60 and rotor 32 through the selected ducts or passageways of the several passageways 54. The fluid from the rotor 32 may exhaust through various passageways or ducts for the following purposes. The exhaust fluid is used both to cool the braking mechanism 44–50 and the pairs of bearings 28 and 40 of the turbine and drive shafts respectively, as well as lubricate the same. If air is the driving fluid, a fine oil mist preferably is entrained in the air and is carried thereby to said aforementioned mechanism. An annular space 72 is provided between shaft 30 and the wall of the housing through which the shaft and exhaust air passes, and exhaust port 26 permits escape of the fluid to the atmosphere. Likewise, an exhaust duct or vent 74 leads from the turbine housing to the cavity 76 in which the bearings 28 and 40 are housed to thereby provide a cooling and lubricating medium for these elements. The exhaust air or other fluid may be vented to the atmosphere from cavity 76 by means of a pair of transverse passageways 77 communicating with a pair of longitudinally extending ducts 70 which, in turn, vent the exhaust fluid into the interior bore 81 of extension 56 for discharge through the interior of cable 80, to atmosphere; see FIGS. 2, 3 and 6. The outer ends of passageways 77 are closed by plugs 79 similar to plugs 66, and for the same reason.

Cooling water, if desired, also may be applied to the cutting tool 42 by means of a conventional water conduit 78 which extends along the exterior of the cylindrical handle 12 to a point of discharge adjacent the tool. This conduit is connected at its opposite end to a flexible supply conduit within cable 80 which is attached to extension 56 by a coupling ferrule 82 in a manner well known in the art.

From the foregoing description of the structural details of the exemplary handpiece or small industrial grinder and their individual functions, it will be seen that the present invention encompasses a relatively low speed, high torque instrument of the turbine type in which the turbine is located at the rear or inner end of a handpiece, thereby permitting the use of a larger turbine capable of generating greater power than in conventional instruments of this type wherein the turbine is in the head of the handpiece. The braking means are such as to readily adapt the instrument to varying conditions encountered in that the brake may be adjusted to provide the desired speed for the operation at hand by a mere turning of the thimble 24, a wide range of speeds being possible such as, for example, between about 2,000 and 50,000 r.p.m. Also, the design is such that the brake is readily accessible for renewal, if necessary, by simply removing the thimble and replacing the same with a new one. It should also be noted that the life of the brake as well as that of the bearings will be greatly prolonged by the cooling and venting means from the turbine as heretofore pointed out.

The arrangement of the parts is such that as a load is imposed upon the bur or other cutting implement, it serves to slow down the rotation thereof with a consequent decrease in the outward deflection of the flexible brake and reduction of the braking action. Consequently, the power generated by the turbine which was required to overcome the braking action is transmitted directly to the tool, under such circumstances, thereby providing the low speed, high torque heretofore referred to. The speed at which such braking action becomes ineffective, as well as the speed at which such braking action becomes effective, is controlled, within quite accurate limits, by the position of the face 50 relative to beveled surfaces 48 of brake member 44 when the latter is idle.

While the invention has been described and illustrated in its several preferred embodiments, it should be understood that the invention is not to be limited to the precise details herein illustrated and described since the same may be carried out in other ways falling within the scope of the invention as claimed.

I claim:

1. A grinding or cutting tool of the hand type comprising a housing, an elongated tubular member connected at one end to said housing, a drive shaft mounted for rotation within said member, means on the outer end of said shaft to connect a grinding or cutting tool thereto, a turbine shaft having a turbine rotor thereon and supported for rotation within said housing, and brake means comprising frictionally coengageable brake members respectively stationary and movable relative to said housing, the movable brake member being responsive to centrifugal force when rotated in direct response to the speed of said turbine shaft and said members being relatively adjustable so that when said turbine shaft revolves at a predetermined speed said movable brake member will be moved into frictional engagement with said stationary brake member and thereby maintain a predetermined constant speed controlled by braking friction corresponding to the relative adjustment of said members, whereby when a tool on said drive shaft is placed under load the speed of said drive shaft is reduced sufficiently to effect separation of said brake members and thus permit the full power of the turbine to be applied to said drive shaft and tool carried thereby.

2. The tool set forth in claim 1 further characterized by said movable brake member comprising a pair of diametrically opposed elements having friction faces thereon engageable with said stationary brake member when said predetermined speed is atained by said turbine shaft.

3. The tool set forth in claim 2 further characterized by said elements with friction faces thereon comprising flexible legs fixedly interconnected at one end to said turbine shaft and the opposite ends of said legs having said friction faces thereon, said flexible legs being responsive to centrifugal force to cause said friction faces to move diametrically apart and into said frictional engagement with said stationary brake member.

4. The tool set forth in claim 3 further characterized by said flexible legs being the legs of a U-shaped member fixed intermediately of the ends of the base thereof to said turbine shaft.

5. A grinding or cutting tool of the hand type comprising a housing, an elongated tubular member connected at one end to said housing, a drive shaft mounted for rotation within said member, means on the outer end of said shaft to connect a grinding or cutting tool thereto, a turbine shaft having a turbine rotor thereon and supported for rotation within said housing, and brake means comprising frictionally coengageable brake members respectively stationary and movable relative to said housing, the movable brake member being responsive to centrifugal force when rotated in direct response to the speed of said turbine shaft and the stationary brake member having a friction surface which is circular in cross-section for engagement by said movable brake member, said members being relatively adjustable to vary the space therebetween when idle so that when said turbine shaft revolves at a predetermined speed said movable brake member will be moved radially outward into frictional engagement with said stationary brake member and thereby maintain a predetermined constant speed controlled by braking friction corresponding to the relative adjustment of said members, whereby when a tool on said drive shaft is placed under load the speed of said drive shaft is reduced sufficiently to effect separation of said brake members and thus permit the full power of the turbine to be applied to said drive shaft and tool carried thereby.

6. The tool set forth in claim 5 further characterized by said stationary brake member being thimble-like and at least partially enclosing said movable brake member.

7. The tool set forth in claim 6 further characterized by said thimble-like stationary brake member being adjustable axially relative to said turbine shaft and movable brake member carried thereby.

8. The tool set forth in claim 7 further characterized by said housing having an opening through which said turbine shaft and movable brake member project, and said thimble-like stationary brake member being threadably connected to said housing relative to said opening for effecting said axial adjustment.

9. A grinding or cutting tool of the hand type comprising a housing, an elongated tubular member connected at one end to said housing, a drive shaft mounted for rotation within said member, means on the outer end of said shaft to connect a grinding or cutting tool thereto, a turbine shaft having a turbine rotor thereon and supported for rotation within said housing, and brake means comprising frictionally coengageable brake members respectively stationary and movable relative to said housing, the movable brake member being U-shaped to provide flexible legs responsive to centrifugal force when rotated in direct response to the speed of said turbine shaft and the stationary brake member having a friction surface which is circular in cross-section for engagement by said outer ends of said legs of said movable brake member when the latter is rotated at a predetermined speed and said brake members being relatively adjustable to determine the speed of said turbine shaft at which the outer ends of the legs of said movable brake member will frictionally engage said stationary brake member and thereby maintain said predetermined speed constant by braking friction, whereby when a tool on said drive shaft is placed under load the speed of said drive shaft is reduced sufficiently to effect separation of said brake members and thus permit the full power of the turbine to be applied to said drive shaft and tool carried thereby.

10. The tool set forth in claim 9 further characterized by the outer ends of said legs and said friction surface of said stationary brake member having complementary inclined surfaces.

11. The tool set forth in claim 10 further characterized by said stationary brake member being formed from self-lubricating synthetic resin.

12. The tool set forth in claim 10 further characterized by said stationary brake member being thimble-like and at least partially enclosing the movable brake member.

13. The tool set forth in claim 12 further characterized by said thimble-like brake member being threadably connected to said housing and formed from self-lubricating synthetic resin, the exterior of said thimble-like brake member being knob-like and manually engageable for rotatable adjustment thereof relative to said housing.

14. The tool set forth in claim 13 further characterized by said movable U-shaped brake member being formed from flexible metal.

15. A grinding or cutting tool of the hand type comprising a housing, a drive shaft supported for rotation by said housing, means on one end of said shaft to connect a grinding or cutting tool thereto, a turbine shaft having a turbine rotor thereon supported for rotation within said housing, means to direct fluid under pressure to said turbine rotor from a source thereof to rotate the turbine and drive said turbine shaft, means to discharge said fluid from said housing after driving said turbine, and brake means comprising frictionally coengageable brake members respectively stationary and movable relative to said housing, and movable brake member being rotated in direct response to the speed of said turbine shaft and said members being relatively adjustable to cause said turbine shaft to revolve at a predetermined speed controlled by braking friction corresponding to the relative adjustment of said members, said fluid exhaust means being arranged to direct at least a portion of the exhaust fluid past said frictionally engageable brake means to cool the same.

16. The tool set forth in claim 15 further characterized by said stationary brake member comprising enclosing means for at least a part of said movable brake member and having an exhaust port therein opening to atmosphere through which the fluid for cooling said brake means discharges.

17. The tool set forth in claim 16 further including bearings supporting said turbine shaft and said housing having means to direct another portion of exhaust fluid through said bearings to cool them prior to discharge from said housing.

18. The tool set forth in claim 15 further characterized by said housing having a compartment adjacent said turbine rotor, reduction gearing in said compartment interconnecting said drive shaft and turbine shaft, and said fluid exhaust means including conduit means communicating with said compartment and operable to discharge a substantial portion of said exhaust fluid to said gears to cool and lubricate the same when oil mist is entrained in said turbine driving fluid.

19. The tool set forth in claim 18 further including antifriction bearings mounted adjacent said gear compartment and having faces exposed to said compartment, whereby said bearings are lubricated simultaneously with said gearing.

References Cited by the Examiner
UNITED STATES PATENTS

| | | | |
|---|---|---|---|
| 1,600,346 | 9/1926 | MacMurchy | 253—59 |
| 2,855,671 | 10/1958 | Lundgren et al. | 32—26 |
| 3,052,984 | 11/1962 | Mitthauer et al. | 32—27 |

RICHARD A. GAUDET, *Primary Examiner.*

R. E. MORGAN, *Assistant Examiner.*